May 18, 1943.         J. D. CHESNUT         2,319,720
PROCESS FOR CEMENTING OIL WELLS AND THE LIKE
Filed July 30, 1940         2 Sheets-Sheet 1

John D. Chesnut
INVENTOR

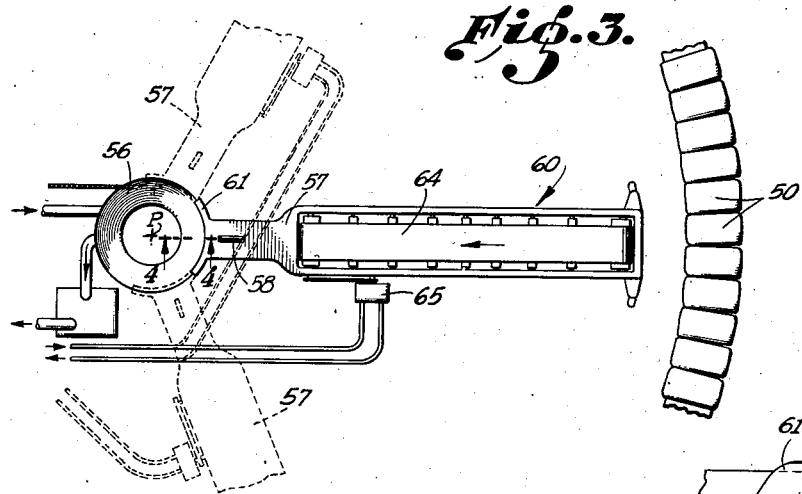
Fig. 3.
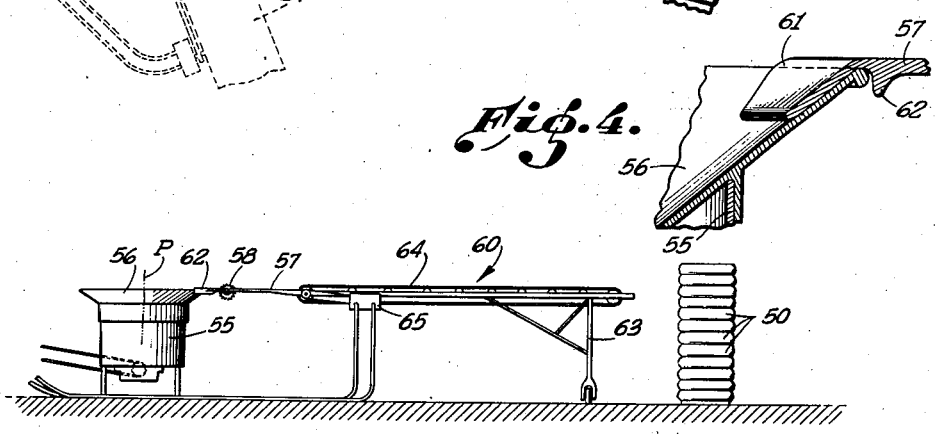
Fig. 4.
Fig. 5.
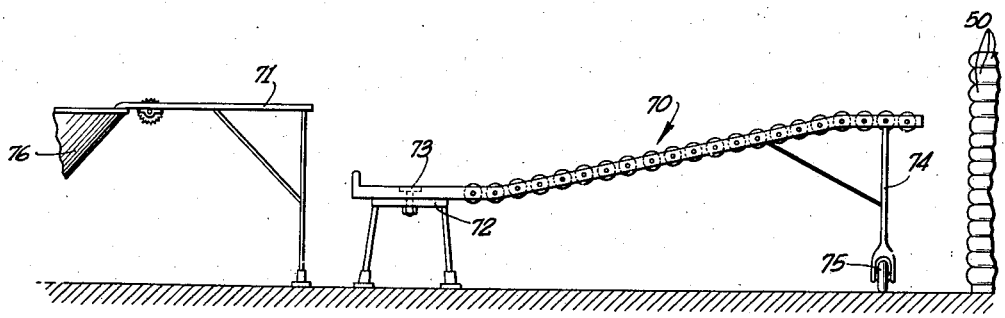
Fig. 6.

Patented May 18, 1943

2,319,720

UNITED STATES PATENT OFFICE 2,319,720

PROCESS FOR CEMENTING OIL WELLS AND THE LIKE

John D. Chesnut, Los Angeles, Calif., assignor, by mesne assignments, to International Cementers, Inc., a corporation of Delaware Application July 30, 1940, Serial No. 348,399

1 Claim. (Cl. 259—146)

This invention relates generally to process for mixing cementitious materials, and is particularly directed to novel and improved steps for handling and mixing cement for oil well cementing operations.

A principal object of this invention is to facilitate the delivery of cement to a mixing apparatus, by materially reducing the manual labor involved.

A more specific object is to provide, in conjunction with a mixing step, steps for storing and conveying dry cementitious material whereby it may be continuously fed to the mixing apparatus with a minimum of effort, thereby accelerating the mixing operation and reducing the cost thereof.

Other objects and advantages will be apparent from the following detailed description of a preferred embodiment and two modifications thereof, reference being had to the accompanying drawings wherein:

Fig. 3 is a plan view of a modification of the system of Fig. 1;

Fig. 4 is an enlarged fragmentary vertical section taken on line 4—4 of Fig. 3 and illustrating a detail of construction;

Fig. 5 is a view in elevation of the apparatus of Fig. 3; and

Fig. 6 is a elevational view of a still further modification.

Figure 1:
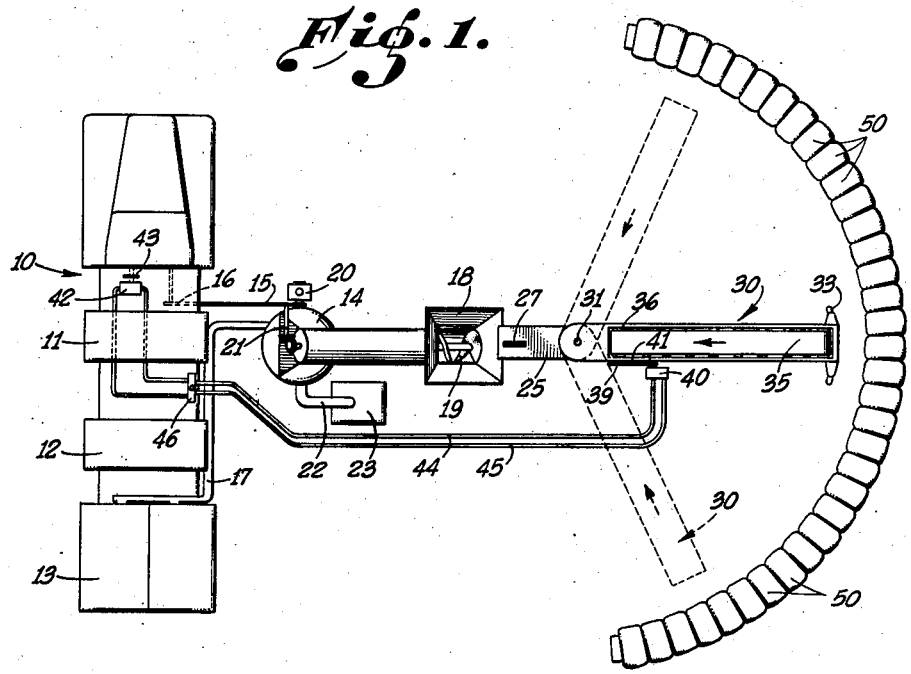
Fig. 1 is a plan view of a complete lay-out embodying the invention.
Figure 2:
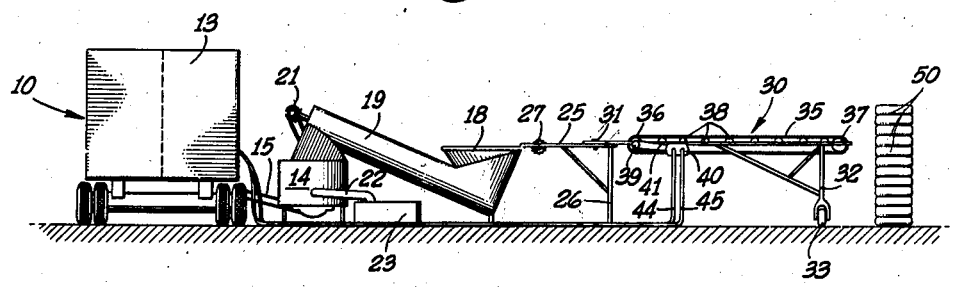
Fig. 2 is a view in side elevation of the apparatus of Fig. 1.

Referring to Figs. 1 and 2 of the drawings, reference numeral 10 designates a conventional oil well cementing truck on which are mounted a pair of cement pumps schematically shown at 11 and 12, and a water storage tank 13. A mixing chamber 14 is mounted alongside the truck in a position to enable the mixing element therein to be driven through a sprocket chain 15 driven by the truck engine. Water or other liquid ingredient is supplied to the mixing chamber from the storage tank 13 through a conduit 17 under the control of suitable valves (not shown). The dry ingredient of the cementitious mixture is delivered to the mixing chamber in a steady stream from a hopper 18 by a power-driven conveyor 19, herein shown as a screw conveyor. The latter may be driven in any suitable manner, and is herein shown as driven from the power take-off 16 through a variable speed transmission indicated at 20 and a gear train generally designated 21, whereby the speed of the conveyor may be varied independently of the speed of the mixing element. The mixed slurry is discharged from the mixing chamber through a conduit 22 into a receptacle 23, whence it is drawn into the pumps and discharged therefrom under pressure to the well through suitable conduits which have not been shown in the drawings inasmuch as they form no part of the present invention.

A cutter board 25 has its inner end supported on the edge of the hopper 18, its outer end being supported on the ground by a suitable standard 26. A sack cutter, herein in the form of a rotatable disk 27, is mounted in the cutter board adjacent the edge of the hopper.

In accordance with the usual practice, an operator is stationed at each side of the cutter board and each grasps an end of a sack of cement and slides it along the board toward the hopper. In passing over the cutter 27, the sack is slit open and its contents discharged into the hopper.

The cementing of a string of casing in an oil well is divided into two principal phases. During the initial phase the cement slurry is mixed and pumped into the well inside the casing to be cemented. After the estimated required amount of cement has been mixed and pumped into the casing, drilling mud is then pumped into the casing on top of the cement slurry to force it downwardly within the casing, out through the lower end of the casing and upwardly in the annular space around the casing until the slurry reaches the surface outside the casing. It is thus apparent that the slurry which is mixed first makes a complete round trip to the bottom of the well and back to the surface, and hence it is essential that the entire operation be performed in as short a time as possible in order to complete it before initial setting of the cement occurs.

For the foregoing reason, the mixing operation is performed at an unusually rapid rate, compared to the rates usually employed in other cementing operations such as paving and construction work. It is not uncommon to mix 1000 standard sacks (1000 cubic feet) of cement in 25 minutes, or at the rate of 45 sacks per minute. The limiting factor on the speed attainable has been the difficulty in delivering the sacks to the cutter board at such a rapid rate. A large quantity such as from 1000 to 2000 sacks, when stacked at the well site preparatory to the cementing operation, must of necessity be spread over a considerable area, some portions of which are necessarily quite remote from the cutter board. Heretofore it has been customary to employ from 6 to 20 extra men to carry the sacks from the pile to the board.

In accordance with the present invention, the manual labor has been reduced to a small fraction of that mentioned above and the delivery of the sacks to the cutter board has been greatly facilitated and speeded up by a novel arrangement of the sacks and by the provision of an adjustable feeding conveyor which can be moved, during the mixing operation, into positions in close proximity to all of the sacks.

Referring once more to Figs. 1 and 2 of the drawings, a conveyor generally designated 30 is pivotally connected to and supported at its discharge end on the outer end of the cutter board, for horizontal swinging movement about an upright axis at 31. The outer, receiving end of the conveyor is supported on the ground by a suitable framework 32 and is preferably provided with ground-engaging wheels 33 to facilitate its movement over the ground. If preferred, however, an arcuate trackway may be employed, especially if the ground surface is unusually rough and uneven.

In the embodiment of Figs. 1 and 2 the conveyor is substantially horizontal and at approximately the same elevation as the cutter board, which is waist-high for the average man. For purpose of illustration, I have shown a power-driven belt conveyor, comprising an endless belt 35 trained over relatively large end rollers 36 and 37 and having its upper active run supported at intervals by idler rollers 38. The end roller 36 functions as a drive pulley for the conveyor belt, and to this end a drive sprocket 39 is secured to one end of the roller shaft.

The sprocket 39 may be driven by any suitable means enabling the conveyor to be operated in any angularly adjusted position about its pivotal axis 31. In the present instance I have shown a fluid drive comprising a fluid motor 40 mounted on the conveyor frame to move therewith and having its driven element connected in driving relation with the sprocket 39 by a drive chain 41. Fluid under pressure is supplied to the motor by a pump 42 mounted on the truck 10 and driven by a second power take-off 43 connected to the truck engine, the pump and the motor 40 being connected by flexible supply and return conduits 44 and 45 permitting movement of the motor through a wide range relative to the pump while maintaining the driving relation between these elements. A manually controlled valve indicated at 46 may be interposed in the conduits 44 and 45 to permit manual control of the operation of the conveyor from an operator's station on the truck.

It will be observed from Fig. 1 that the sacks of cement 50 are disposed in an arcuate row having its center at the pivotal axis 31 of the feeder conveyor 30. In this manner all portions of a large pile of sacks are brought within easy reach of the loading end of the conveyor by swinging the latter about its pivot, as indicated in dotted lines. Thus one or two men are capable of loading the sacks onto the conveyor as rapidly as they can be opened and emptied by the men stationed at the cutter board. By providing a wheeled support for the outer end of the conveyor, it may be moved from time to time with little effort and no substantial loss of time.

In Figs. 3 to 5 there is shown a modification of the system just described. In this embodiment of the invention, the screw conveyor has been omitted and the cement is discharged from the sacks directly into the mixing chamber 55 through a hopper or funnel 56 mounted on the upper side of the chamber. A cutter board 57 is supported at its inner end on the edge of the hopper 56 and is provided with the usual sack cutter 58.

It is within the contemplation of the invention that the cutter board and feeder conveyor in the embodiment of Figs. 3 and 4 may be identical with that shown in Figs. 1 and 2. In this event the only difference between the two embodiments would reside in the fact that in one case the cement is discharged into a feed hopper for a bulk conveyor, while in the other case it is discharged directly into the mixing chamber. However, in order to illustrate a further modification, in Figs. 3 and 4 the cutter board 57 is shown as rigid with the feeder conveyor 60, both the cutter board and conveyor being mounted for pivotal movement about the central upright axis P of the mixing chamber. It will be observed that the hopper 56 is frustro-conical in shape, providing a circular lip at its upper edge concentric with the chamber axis.

The inner end of the cutter board may be supported on the lip of the hopper in any desired manner permitting arcuate adjustment of the cutter board and conveyor about the axis of the hopper and mixer. In Fig. 4 there is shown a construction providing adequate support of the cutter board against transverse tilting and radially inward or outward movement thereof relative to the hopper, while permitting arcuate movement around the edge of the hopper. An arcuate inner lip 61 of substantial width and depth is formed integral with the cutter board, and is of the proper curvature and downward and inward inclination to conform to the conical inner surface of the hopper. An outer lip 62 projects downwardly from the board and forms in conjunction with the inner lip 61 a downwardly facing arcuate recess adapted to receive the upper edge of the hopper.

The conveyor 60 of Figs. 3 and 5 is otherwise similar in all respects to the conveyor 30 of Figs. 1 and 2, being supported at its outer end on uprights 63 and having an endless conveyor belt 64 driven by a fluid motor 65 deriving its power from a suitable source such as the pump 42 of Fig. 1.

As in the embodiment previously described, the sacks of cement 50 are stacked in an arcuate row having its center at the axis of pivotal movement of the conveyor, which in this case is the central axis P of the mixing chamber 55 and hopper 56. Thus as the conveyor and cutter board are shifted about the axis P the loading end of the conveyor is successively moved into close proximity to all of the sacks in the pile.

In Fig. 6 there is shown a still further modification of the invention. In this embodiment a gravity feed conveyor 70 is employed in lieu of the power-operated conveyors of the two previously described embodiments. In order to provide the downward grade necessary to cause the sacks of cement to move of their own weight, while at the same time maintaining the loading end of the conveyor at a convenient height, the discharge end of the conveyor is preferably disposed slightly below the elevation of the cutter board 71. For purpose of illustration, the discharge end of the conveyor is shown as pivotally mounted on an independent supporting frame 72 for horizontal swinging movement relative thereto about an upright axis at 73. The loading end of the conveyor is supported by a framework 74 having one or more ground-engaging wheels 75.

The cutter board 71 is shown as supported at its discharge end on a hopper 76, and it will be understood that this hopper may correspond to either the feed hopper 18 of Figs. 1 and 2 or the hopper 56 of Figs. 3 and 5.

The operation of the system shown in Fig. 6 is similar to that of the other embodiments. The cement sacks 50 are stacked on an arc concentric with the path of arcuate movement of the conveyor 70 about its pivot 73, thus placing them within easy reaching distance of the loading end of the conveyor in its different angularly related positions.

Having described one embodiment of the invention and two modifications thereof, it is to be understood that the invention is not limited to the precise details of these embodiments, but is of the full scope of the appended claim.

I claim:

In a method of cementing wells, the steps of providing a predetermined number of sacks of cementitious material; piling said sacks in an arc; feeding said cementitious material from said pile progressively along said arc and on radial lines toward the center of said arc; forming a slurry of said cementitious material upon its arrival at the center of said arc; and delivering said slurry to a well.

JOHN D. CHESNUT.